United States Patent [19]
Takeuchi et al.

[11] Patent Number: 5,958,165
[45] Date of Patent: Sep. 28, 1999

[54] METHOD OF MANUFACTURING CERAMIC MEMBER

[75] Inventors: Yukihisa Takeuchi, Nishikamo-gun; Tsutomu Nanataki, Toyoake; Hisanori Yamamoto, Nagoya, all of Japan

[73] Assignee: NGK Insulators, Ltd., Japan

[21] Appl. No.: 08/891,200

[22] Filed: Jul. 10, 1997

[30] Foreign Application Priority Data

Jul. 19, 1996 [JP] Japan .................................. 8-190874

[51] Int. Cl.$^6$ .................................................. B32B 31/26
[52] U.S. Cl. .................................. 156/89.11; 156/89.12; 156/252; 156/253; 347/71
[58] Field of Search .......................... 156/89.11, 89.12, 156/252, 253; 347/40, 41, 42, 43, 44, 54, 71, 72, 74

[56] References Cited

U.S. PATENT DOCUMENTS

| 5,512,793 | 4/1996 | Takeuchi et al. ........................ 310/328 |
| 5,517,076 | 5/1996 | Takeuchi et al. ........................ 310/358 |
| 5,545,461 | 8/1996 | Takeuchi et al. . |
| 5,600,197 | 2/1997 | Takeuchi et al. ........................ 310/328 |
| 5,643,379 | 7/1997 | Takeuchi et al. . |
| 5,728,244 | 3/1998 | Nanataki et al. ................... 156/252 X |
| 5,753,160 | 5/1998 | Takeuchi et al. . |

FOREIGN PATENT DOCUMENTS

| 0 744 388 A1 | 11/1996 | European Pat. Off. . |
| 0 744 389 A1 | 11/1996 | European Pat. Off. . |
| 2 309 007 | 7/1997 | United Kingdom . |

OTHER PUBLICATIONS

Mr. M. Miura et al.—The 4th International Congress in Non–Impact Printing Technology, 1987 (p77–p80). (Development in the Air Assisted Electrostatic Inkjet Printer: M. Miura, Y. Itho, T. Iwasawa, G. Oda, K. Akami, Y. Sekiguchi—Matsushita Research Institute Tokyo, Inc.).

Primary Examiner—Curtis Mayes
Attorney, Agent, or Firm—Wall Marjama Bilinski & Burr

[57] ABSTRACT

A method of manufacturing a ceramic member composed of a thin plate having a plurality of fine through holes and a rigid plate integrally formed with the thin plate by firing. The thin plate is supported by the rigid plate at least at both sides of a portion where the plurality of fine through holes are formed. A minimum value of the size of the holes is 150 μm or less, a thickness of the thin plate 7 is 100 μm or less, and a minimum value of the interval between adjacent holes is 150 μm or less. A tensile strength σ of a green sheet for the thin plate is 10 kgf/cm$^2$ or more and 200 kgf/cm$^2$ or less. An elongation factor represented by the expression ΔI·S/T, where ΔI represents an amount (mm) of elongation at rupture; T, a tension (kgf) at rupture; and S, a cross section (mm$^2$) of the green sheet for the thin plate, is 0.5 mm$^3$/kgf or more and 25.0 mm$^3$/kgf or less. An absolute value of the difference of pre-sintering temperature $T_{50}$ between the green sheet for the thin plate and the green sheet for the rigid plate is 50° C. or less, and an absolute value of the difference of firing shrinkage factor F therebetween is 1.5% or less. The green sheet for the thin plate having the plurality of fine through holes 1 formed by punching thereupon is laminated upon the rigid plate to form an integral laminate, and then fired.

16 Claims, 11 Drawing Sheets

METHOD OF MANUFACTURING CERAMIC MEMBER

BACKGROUND OF THE INVENTION AND RELATED ART STATEMENT

The present invention relates to a method of manufacturing a ceramic member having a plurality of fine through holes.

A member comprising a thin plate having a plurality of fine through holes and being supported by a rigid plate is used as a component of an ion current control head, high-precision electric field shutter, encoder, scale or the like to detect or record a position by controlling the emission of a gas, liquid, fine particle solid, light or the like from the fine through holes.

Materials such as a metal, synthetic resin or the like have conventionally been used for such a member. To meet the demand for higher density, precision and reliability, a ceramic member has become the main stream of the market in recent years.

In the above ceramic member, as for the support of a thin plate by a rigid plate, a thin plate 7 may be supported by different rigid plates 9 at both sides of a portion 30 having fine through holes as shown in FIGS. 1A and 1B, or may be supported from around a portion 3 having fine through holes 1 by forming window portions 3 in the rigid plate 9 and laminating the thin plate 7 upon the rigid plate 9 such that the portions 30 having fine through holes 1 cover the window portions 3 as shown in FIGS. 2A to 2C and 3A to 3C. FIGS. 4A to 4C show a ceramic member 2 prepared by laminating a rigid plate 9 consisting of 3 layers having differently shaped window portions 3 upon a thin plate 7 having fine through holes 1.

Supporting the thin plate by the rigid plate is intended to improve the rigidity of the ceramic member so as to make it more practical in manufacture and use.

A ceramic member in which a thin plate having a plurality of fine through holes is supported by a rigid plate is manufactured by making a green sheet for the thin plate and a green sheet for the rigid plate, laminating the green sheet for the thin plate upon the green sheet for the rigid plate to form an integral laminate and firing the laminate from a viewpoint of improving dimensional stability after firing. That is, since the thin plate has a plurality of fine through holes, if it is fired alone, it is readily distorted by firing shrinkage. Although the fine through holes are formed by punching before firing, they may be formed before the green sheet for the thin plate is laminated upon the green sheet for the rigid plate or after they are joined together into an integral laminate.

In recent years, it has been desired to further reduce the thickness of the thin plate from a viewpoint of improving the resistance for passing a gas, fine particle solid, liquid or the like and the uniformity of an electric field and further reduce the size and the interval between fine through holes from a view point of increasing density. More specifically, it has been desired to reduce a thickness of the thin plate after firing to 100 µm or less, preferably 50 µm or less and both a minimum value of the size of fine through holes and a minimum value of the interval between adjacent fine through holes after firing to 150 µm or less.

However, since the strength of a ceramic green sheet generally lowers when the thickness thereof decreases, there is such a problem that a crack or a defect causing a crack is generated between the fine through holes during the formation of the fine through holes in the green sheet for the thin plate by punching when the thickness of the thin plate is further reduced. Cracks are readily generated in the process of laminating the green sheet for the thin plate upon the green sheet for the rigid plate or by stress at the time of firing and further the above defect develops into a crack at the time of use in many cases, thereby impairing the reliability of a product. When such a crack or defect is generated, the interior wall of the fine through hole becomes rough and the resistance for passing a gas, liquid or the like increases. When an interval between adjacent fine through holes is further reduced, a crack or defect is readily generated likewise.

Meanwhile, as the green sheet generally has the property of stretching easily when it is made thin, when the thin plate is made thinner, the green sheet for the thin plate stretches when it is punched or handled, thereby deteriorating the positional accuracy of the fine through holes. As a result, there is such a problem that a defect such as a crack is readily generated between the fine holes.

SUMMARY OF THE INVENTION

The present invention has been made under the above circumstances, and it is an object of the present invention to provide a ceramic member production method which does not cause the generation of cracks and a reduction in the positional accuracy of the fine through holes even when the thickness of the thin plate and the interval between adjacent fine through holes are reduced.

In other words, according to the present invention, there is provided a method of manufacturing a ceramic member comprising a thin plate having a plurality of fine through holes and a rigid plate integrally formed with the thin plate by firing, said thin plate being supported by said rigid plate at least at both sides of a portion where the plurality of fine through holes are formed, which comprises the steps of: providing a green sheet for the thin plate having a tensile strength σ of 10 kgf/cm² or more and 200 kgf/cm² or less, an elongation factor represented by the expression $\Delta I \cdot S / T$, where $\Delta I$ represents an amount (mm) of elongation at rupture; T, a tension (kgf) at rupture; and S, a cross section (mm²) of the green sheet for the thin plate, being 0.5 mm³/kgf or more and 25.0 mm³/kgf or less; providing a green sheet for the rigid plate, an absolute value of the difference of pre-sintering temperature $T_{50}$ between the green sheet for the thin plate and the green sheet for the rigid plate being 50° C. or less, and an absolute value of the difference of firing shrinkage factor F therebetween being 1.5% or less; laminating said green sheet for the thin plate having the plurality of fine through holes formed by punching upon said green sheet for the rigid plate to form an integral laminate; and firing the integral laminate to obtain the ceramic member, a minimum value of the size of the holes being 150 µm or less, a thickness of the thin plate being 100 µm or less, and a minimum value of the interval between adjacent holes being 150 µm or less.

According to the present invention, there is further provided a method of manufacturing a ceramic member comprising a thin plate having a plurality of fine through holes and a rigid plate integrally formed with the thin plate by firing, said thin plate being supported by said rigid plate at least at both sides of a portion where the plurality of fine through holes are formed, which comprises the steps of: providing a green sheet for the thin plate having a tensile strength σ of 10 kgf/cm² or more and 200 kgf/cm² or less, an elongation factor represented by the expression $\Delta I \cdot S / T$, where ΔI represents an amount (mm) of elongation at rupture; T, a tension (kgf) at rupture; and S, a cross section (mm²) of the green sheet for the thin plate, being 0.5 mm³/kgf or more and 25.0 mm³/kgf or less; providing a green sheet for the rigid plate, an absolute value of the difference of pre-sintering temperature $T_{50}$ between the green sheet for the thin plate and the green sheet for the rigid plate being 50° C. or less, and an absolute value of the difference of firing shrinkage factor F therebetween being 1.5% or less; laminating said green sheet for the thin plate upon said green sheet for the rigid plate to form an integral laminate; forming the plurality of fine through holes by punching in said green sheet for the thin plate; and firing the integral laminate to obtain the ceramic member, a minimum value of the size of the holes being 150 μm or less, a thickness of the thin plate being 100 μm or less, and a minimum value of the interval between adjacent holes being 150 μm or less.

In the above method of manufacturing a ceramic member, a thickness of the thin plate is preferably 50 μm or less.

In the above method of manufacturing a ceramic member, an absolute value of the difference of pre-sintering temperature $T_{50}$ between the green sheet for the thin plate and the green sheet for the rigid plate is preferably 20° C. or less.

In the above method of manufacturing a ceramic member, an average particle diameter $D_L$ of the ceramic powders constituting the green sheet for the thin plate is preferably 0.1 μm or more and 1.2 μm or less, a spherical equivalent diameter $D_{BET}$ calculated from the BET specific surface area of the ceramic powders is preferably 0.02 μm or more and 0.5 μm or less, a volume percentage A of the ceramic powders in the green sheet for the thin plate is preferably 40% or more and 55% or less, and the total of the volume percentage A of the ceramic powders and a volume percentage B of organic components is preferably 80% or more and 98% or less.

In the above method of manufacturing a ceramic member, the thin plate preferably contains a partially stabilized zirconia as a main component and an average crystal grain diameter thereof is preferably 2 μm or less. The partially stabilized zirconia is preferably obtained by partially stabilizing zirconia by 2 to 6 mol % of yttrium oxide.

Further, in the above method of manufacturing a ceramic member, a maximum value w (mm) of width in a transverse direction of a portion having fine through holes of the thin plate supported by the rigid plate at both sides and an interval d (μm) between adjacent fine through holes preferably have the relationship represented by the following expression (A).

$$w \geq 10/d \tag{A}$$

In this case, the size of the fine through hole is a diameter when the shape of the fine through hole is circular, a long side when it is rectangular, a long diameter when it is elliptic and the length of the longest diagonal line when it is polygonal. The shape of the fine through hole may be one of the above shapes or a combination thereof. The size of the fine through holes is an average value of measurement values of the front surface and the rear surface of the thin-walled ceramic plate.

Further, the interval d between adjacent fine through holes is the thickness of the shortest wall interposed between adjacent fine through holes as shown in FIG. 8 or 13.

BRIEF DESCRIPTION OF THE DRAWINGS

These and other objects as well as advantages of the present invention will become clear from the following description of preferred embodiments of the present invention with reference to the accompanying figures, in which:

FIGS. 1A and 1B show an example of a ceramic member manufactured by a method of the present invention, in which FIG. 1A is a plan view and FIG. 1B is a sectional view taken along a line of I—I.

FIGS. 2A to 2C show another example of a ceramic member manufactured by the method of the present invention, in which FIG. 2A is a plan view, FIG. 2B is a sectional view taken along a line of I—I, and FIG. 2C is a sectional view taken along a line of II—II.

FIGS. 3A to 3C show further another example of a ceramic member manufactured by the method of the present invention, in which FIG. 3A is a plan view, FIG. 3B is a sectional view taken along a line of I—I and FIG. 3C is a sectional view taken along a line of II—II.

FIGS. 4A to 4C show a still another example of a ceramic member manufactured by the method of the present invention, in which FIG. 4A is a plan view, FIG. 4B is a sectional view taken along a line of I—I and FIG. 4C is a sectional view taken along a line of II—II.

FIGS. 11A to 11C show a still further example of a ceramic member manufactured by the method of the present invention, in which FIG. 11A is a plan view, FIG. 11B is a sectional view taken along a line of I—I and FIG. 11C is a sectional view taken along a line of II—II.

FIGS. 12A to 12C show a still further example of a ceramic member manufactured by the method of the present invention, in which FIG. 12A is a plan view, FIG. 12B is a sectional view taken along a line of I—I and FIG. 12C is a sectional view taken along a line of II—II.

PREFERRED EMBODIMENTS OF THE INVENTION

According to the present invention, it is possible to produce a ceramic member which does not generate cracks even when a thickness of a thin plate and an interval between adjacent fine through holes are reduced and has a high positional accuracy of fine through holes and an improved smoothness of wall portions of the holes by controlling various characteristic values of green sheets used for manufacturing the ceramic member.

According to the method of manufacturing a ceramic member of the present invention, it is directed to a ceramic member in which a minimum value of the size of fine through holes is 150 μm or less, a thickness of the thin plate is 100 μm or less, and the minimum value of the interval between adjacent fine through holes is 150 μm or less.

It is possible to meet demand for high density and high precision by setting the minimum value of the size of the fine through holes and the minimum value of the interval between adjacent fine through holes to 150 μm or less. It is also possible to prevent the blocking of the holes and the generation of burrs during punching and to reduce resistance when powders or the like pass through the fine through holes by setting the thickness of the thin plate to 100 μm or less.

In the method of manufacturing a ceramic member of the present invention, a tensile strength σ of a green sheet for the thin plate is set to 10 kgf/cm² or more and 200 kgf/cm² or less, and an elongation factor represented by the expression ΔI·S/T, where ΔI represents an amount (mm) of elongation at rupture; T, a tension (kgf) at rupture; and S, a cross section (mm²) of the green sheet for the thin plate, is set to 0.5 mm³/kgf or more and 25.0 mm³/kgf or less.

Further, an absolute value of the difference of pre-sintering temperature $T_{50}$ between the green sheet for the thin plate and the green sheet for the rigid plate is set to 50° C. or lower and an absolute value of the difference of the firing shrinkage factor F therebetween is set to 1.5% or less.

Figure 1:
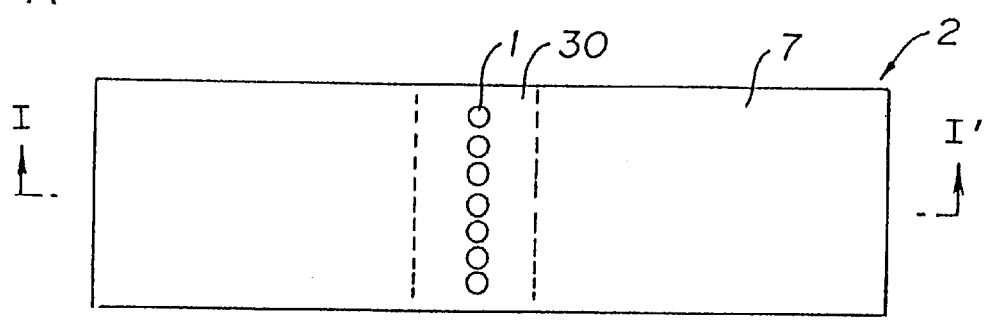
Figure 1:
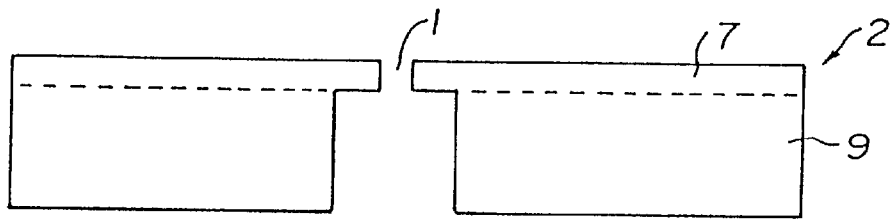
Figure 2:
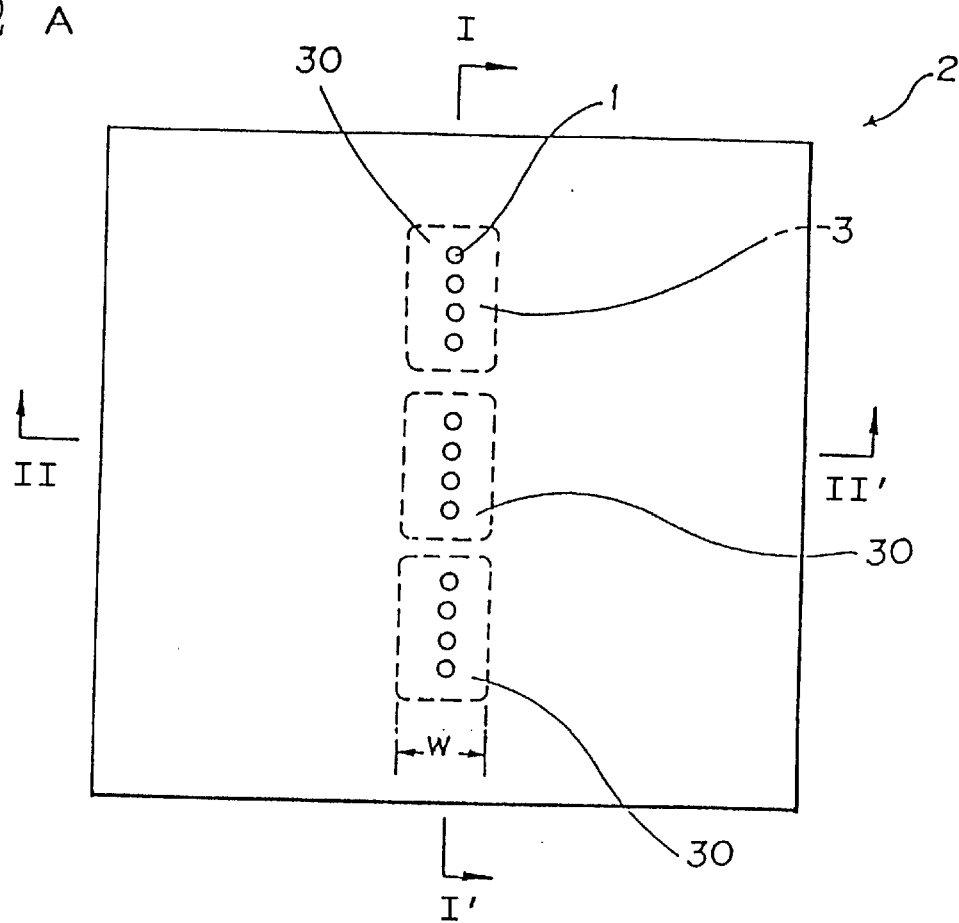
Figure 2:
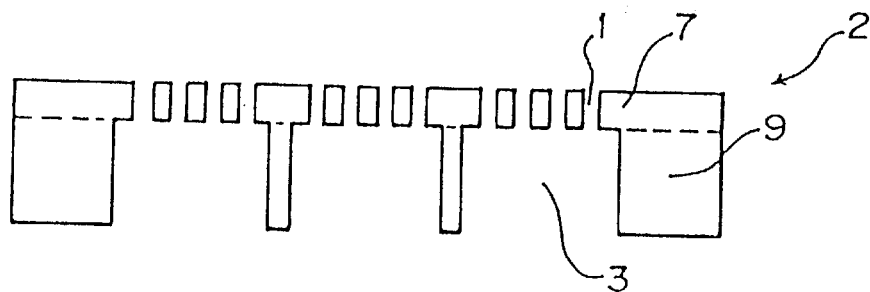
Figure 2:
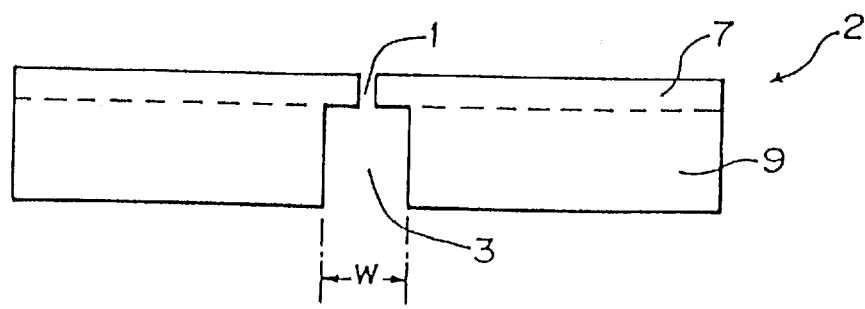
Figure 3:
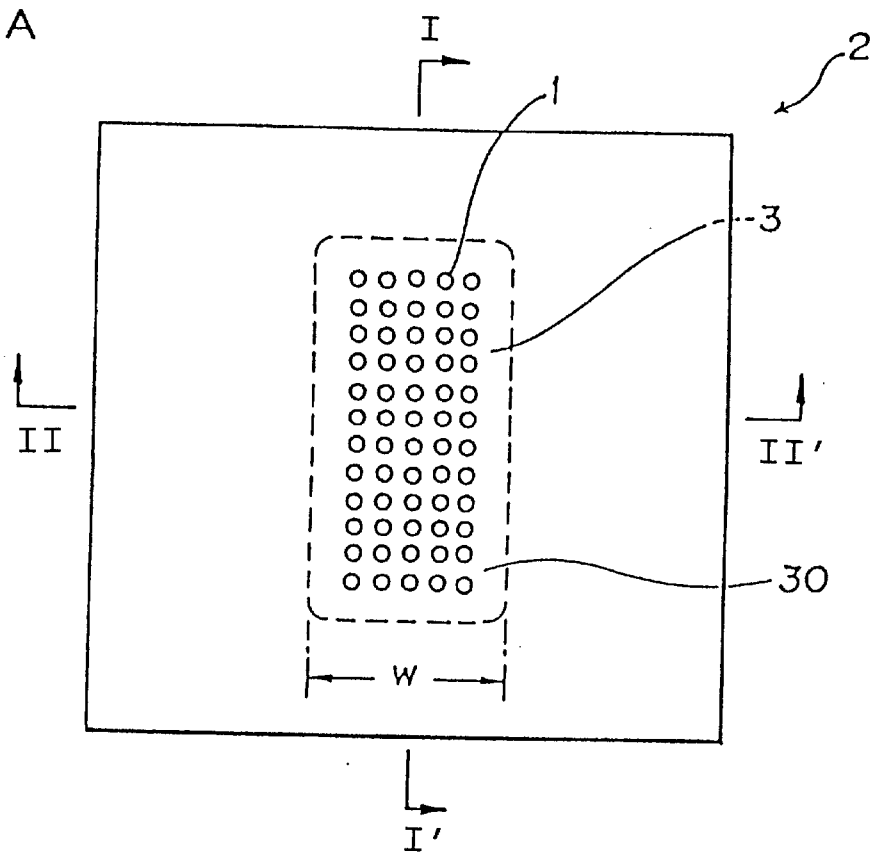
Figure 3:
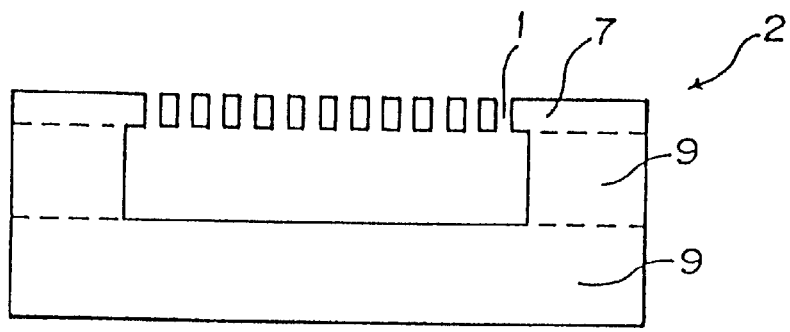
Figure 3:
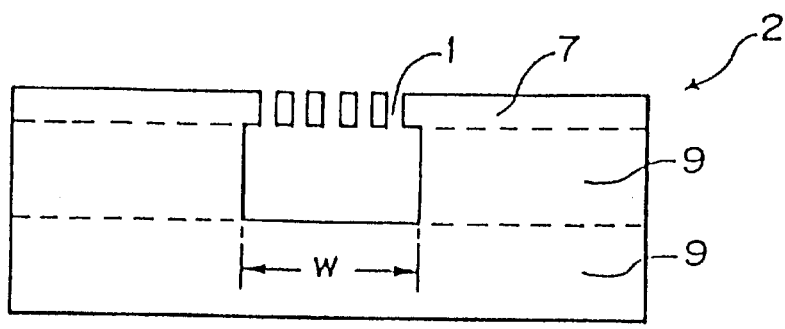
Figure 4:
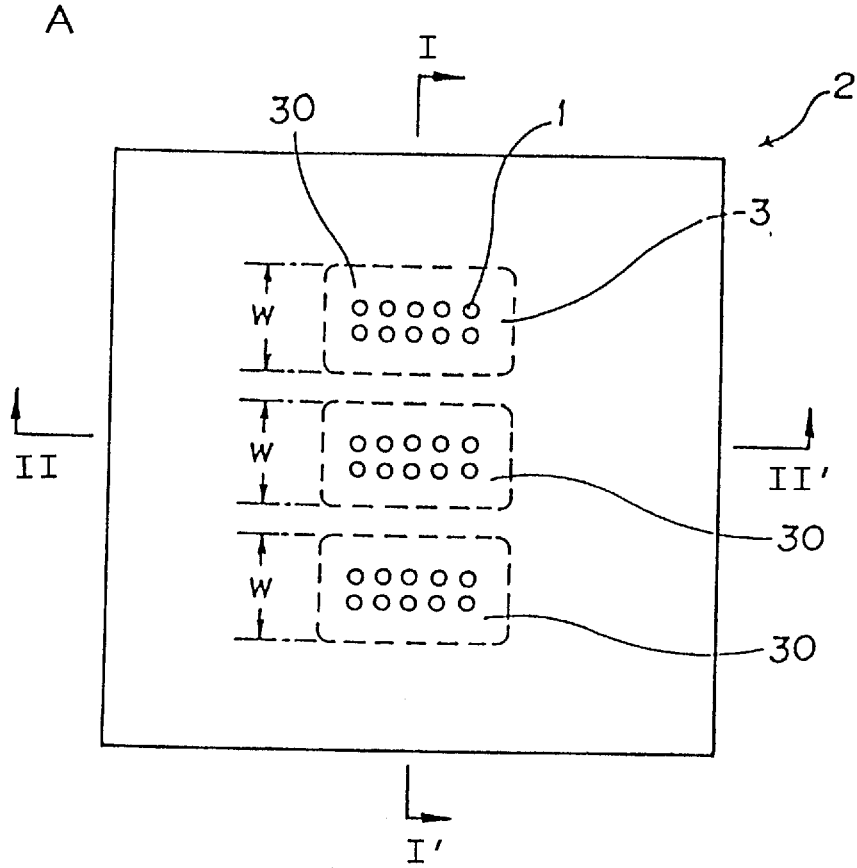
Figure 4:
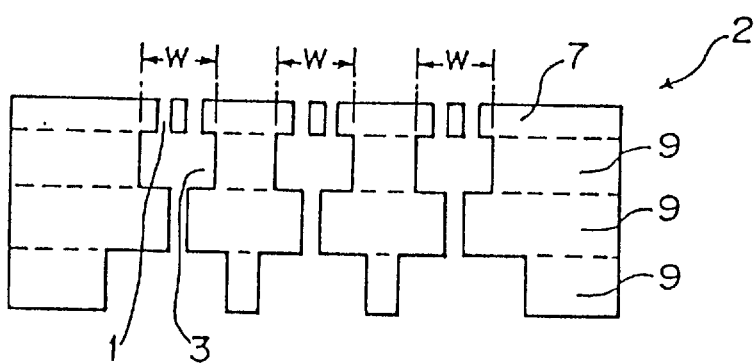
Figure 4:
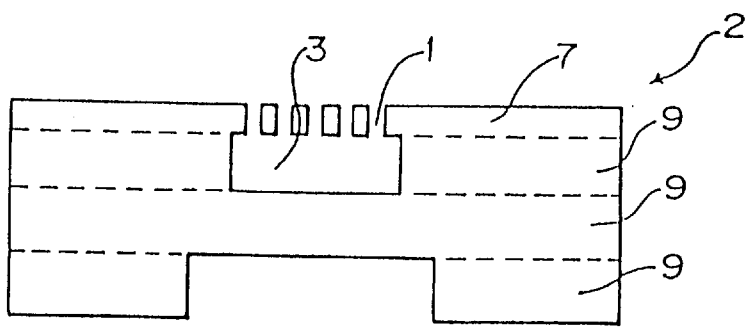
Figure 5:
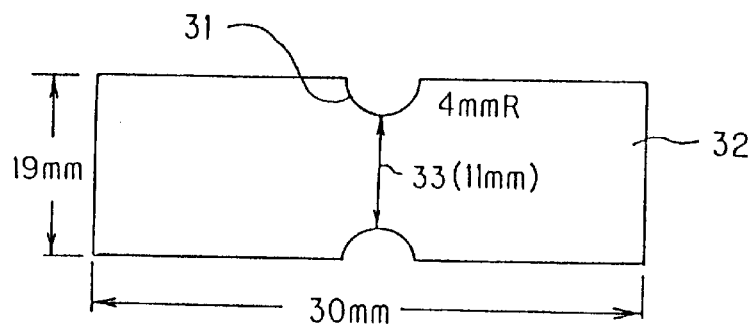
FIG. 5 is a schematic drawing showing an exemplary sample of a green sheet for a thin plate for the measurement of an elongation amount at rupture and a tension at rupture.

An amount of elongation at rupture ΔI (mm) and a tension at rupture T(kgf) of the green sheet for the thin plate are measured by a rheometer at a tension rate of 2 cm/min. As shown in FIG. 5, the measurement is carried out by using a sample 32 prepared by forming semicircular cut away portions 31 having a radius of 4 mm in central portions of two long sides of a 19 mm wide and 30 mm long rectangular green sheet for the thin plate. As for the cross section S (mm²) of the green sheet for the thin plate, the cross section of a portion in which the width of the sample is minimal by the formation of the cut away portions 31 is used and represented by the product of a shortest distance 33 between the two cutaway portions 31 and the thickness (mm) of the green sheet for the thin plate. The tensile strength σ (kgf/cm²) is calculated from an expression (T/S)×100 (S represents a cross section (mm²) and T represents a tension at rupture (kgf) of the green sheet for the thin plate).

The reason why the value of tensile strength σ is set to 10 kgf/cm² or more and 200 kgf/cm² or less is that, when the value σ is less than 10 kgf/cm², a crack may be generated between adjacent fine through holes when a plurality of fine through holes are formed by punching. The value σ is more preferably 20 kgf/cm² or more, much more preferably 50 kgf/cm² or more. When the value σ is more than 200 kgf/cm², a mold pin may be broken during punching, the surface of the interior wall portion of the hole may be rough, or a defect causing a crack is readily generated. The value σ is most preferably 100 kgf/cm² or less.

Figure 6:
FIG. 6 is a schematic drawing showing the state of a green sheet for a thin plate when fine through holes are formed in the green sheet for the thin plate manufactured by the method of the prior art by punching.

Further, the reason why the value of the elongation factor of the green sheet for the thin plate represented by ΔI·S/T is set to 0.5 mm³/kgf or more and 25.0 mm³/kgf or less is that, when it is less than 0.5 mm³/kgf, a crack is readily generated around or between adjacent fine through holes during punching. If the value is more than 25.0 mm³/kgf, as the green sheet 32 for the thin plate is curved toward a punching direction shown by an arrow during punching as shown in FIG. 6, the fine through holes may become nonuniform in shape or portions around the fine through holes may have an uneven surface. Further, since the green sheet for the thin plate vibrates easily during punching, a crack may be generated between adjacent fine through holes, or a defect may be manufactured around the fine through hole or the interior walls of the holes, resulting in a crack during firing. Further, there is such inconvenience that the positional accuracy of the fine through holes deteriorates.

It should be noted that the above elongation factor is more preferably 13.0 mm³/kgf or less, most preferably 5.0 mm³/kgf or less and 1.0 mm³/kgf or more.

Further, the firing shrinkage factor F represents the shrinkage factor of a length in a plane direction when the green sheet for the thin plate or the green sheet for the rigid plate is fired alone at the same temperature as that when they are fired integrally. The pre-sintering temperature $T_{50}$ is a temperature at which firing shrinkage factor reaches 50% of the above firing shrinkage factor F in the sintering process and an index representing a sintering rate (progress state of shrinkage in the sintering process).

The firing shrinkage factor F is calculated from the expression ((length before firing—length after firing)/length before firing)×100 (%) based on the average length of the four sides of the green sheet before and after firing when a 10.0×10.0 mm (square) sample is fired alone in the same firing profile as the ceramic member, for example, in a main surface direction of the green sheet and not in a thickness direction. The shrinkage factor data in the thickness direction of the green sheet is ignored.

Figure 7:
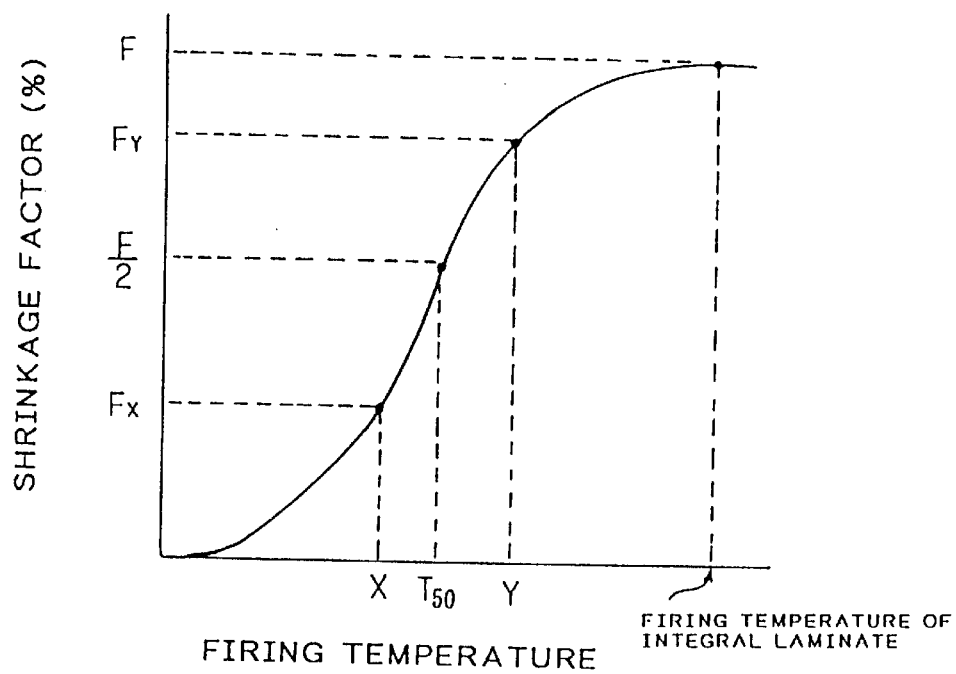
FIG. 7 is a graph showing a firing shrinkage curve of the green sheet for the thin plate or a green sheet for a rigid plate.

The pre-sintering temperature $T_{50}$ is calculated from the following approximation expression when a 10.0×10.0 mm sample, for example, is fired at two different temperatures X and Y whose difference is 50° C. or less and which are considered to be present at both sides of the pre-sintering temperature in a firing-shrinkage curve shown in FIG. 7 and the shrinkage factors $F_x$ and $F_y$ at these temperatures are calculated.

$$X+\{(F/2-F_x)/(F_y-F_x)\}\times(Y-X)$$

To prevent the generation of a crack during firing, it is desirable that the firing-shrinkage curve of the green sheet for the rigid plate should approximate to that of the green sheet for the thin plate, the absolute value of the difference of pre-sintering temperature $T_{50}$ between these green sheets must be 50° C. or less, and the absolute value of the difference of firing shrinkage factor F therebetween must be 1.5% or less. These absolute values are preferably 20° C. or less and 1.0% or less, respectively.

When the absolute value of the difference of pre-sintering temperature $T_{50}$ is more than 50° C. or the absolute value of the difference of firing shrinkage factor F is more than 1.5%, a crack is readily generated between adjacent fine through holes by stress during firing and the thin plate is easily wrinkled or recessed.

The fine through holes may be formed before the green sheet for the thin plate is laminated upon the green sheet for the rigid plate or after these green sheets are joined together into a single laminate. The formation of the fine through holes in the laminate obtained by joining the green sheets together is preferred because the forming work is easier, the green sheet for the thin plate is rarely wrinkled, and further, the positional dimensional accuracy of the fine through holes is improved.

Unlike the processing of a fired substrate, the formation of the fine through holes by punching makes it impossible to cut the particles and difficult to cut an agglomerate of particles contained in the green sheets. Therefore, if the particle diameter of the powders is large, the processed surface cannot be formed at a high accuracy, the smoothness of the processed surface becomes worse, and burrs are manufactured.

Therefore, according to the method of manufacturing a ceramic member of the present invention, the average particle diameter $D_L$ of ceramic powders constituting the green sheet for the thin plate is preferably 0.1 μm or more and 1.2 μm or less, and the sphere equivalent diameter $D_{BET}$ calculated from the BET specific surface area of the ceramic powders is preferably 0.02 μm or more and 0.5 μm or less. By setting $D_L$ and $D_{BET}$ of the powders to the above range, the elongation of the green sheet can be effectively reduced at the time of handling such as making the fine through holes advantageously.

As for the average particle diameter of the powders, for example, the average particle diameter of slurry before the molding of the green sheet is measured using the LA-700 laser diffraction particle size analyzer of Horiba Ltd. by diluting the slurry with a solvent.

The sphere equivalent diameter $D_{BET}$ (μm) is calculated from the expression $D_{BET}=6/\rho S$ (ρ represents a theoretical density of the powders (g/cm$^3$) and S is a BET specific surface area value of the powders (m$^2$/g)) based on the measurement value of BET specific surface area. The BET specific surface area value is measured using a sample heated at 500° C. for 2 hours to remove organic components such as a binder, plasticizer and dispersant contained in the green sheet for the thin plate.

When the average particle diameter $D_L$ of the powders is less than 0.1 μm or the sphere equivalent diameter $D_{BET}$ is less than 0.02 μm, it is difficult to produce a homogeneous slurry and a crack is generated in the green sheet with the result of lowered green sheet strength. On the other hand, when the average particle diameter $D_L$ of the powders is more than 1.2 μm or the sphere equivalent diameter $D_{BET}$ is more than 0.5 μm, the interior wall surfaces of the fine through holes become uneven, the fine through holes become nonuniform in shape, and the resistance for passing a gas, liquid, fine particle solid or the like becomes large. Further, a crack is readily generated in portions around the interior walls of the fine through holes.

The volume percentage A of the ceramic powders in the green sheet for the thin plate is preferably adjusted to 40% or more and 55% or less and the total of the volume percentage A of the ceramic powders and the volume percentage B of the organic components to 80% or more and 98% or less from a viewpoint of improving the processing accuracy of the fine through holes and the smoothness of the processed surface and reducing the generation of a defect and the elongation of the green sheet.

At The volume percentage A of the ceramic powders is calculated from the expression $GD \times [a/(a+b)] \times 1/\rho_{cs}$ (a represents parts by weight of the ceramic powders contained in the green sheet, b represents parts by weight of the organic components in the green sheet (b=$\Sigma b_i$), GD represents a green density of the green sheet (g/cm$^3$), and $\rho_{cs}$ represents a theoretical density of the ceramic powders (g/cm$^3$)).

Further, the organic components refer to a binder, plasticizer, dispersant and the like and the volume percentage B of the organic components is calculated from the expression $GD \times \Sigma([b_i/(a+b)] \times 1/\rho_i)$ ($b_i$ represents parts by weight of each organic component contained in the green sheet, and $\rho_i$ represents a theoretical density of each organic component (g/cm$^3$)).

When the volume percentage A of the ceramic powders is less than 40%, the firing shrinkage factor F of the green sheet for the thin plate varies greatly, whereby the dimensional accuracy deteriorates and the strength of the thin plate after firing lowers disadvantageously. When the volume percentage A of the ceramic powders is more than 55%, as the distance between powder particles contained in the green sheet for the thin plate is very short, it is difficult to form the fine through holes by punching, binder removing properties at the time of firing deteriorate, and a crack or defect is manufactured between adjacent fine through holes in some cases.

On the other hand, when the total of the volume percentage A of the ceramic powders and the volume percentage B of the organic components is less than 80%, the elongation factor of the green sheet for the thin plate becomes large and the tensile strength thereof lowers. When it is more than 98%, the elongation factor of the green sheet for the thin plate becomes large, and the lamination properties thereof with the green sheet for the rigid plate deteriorate, thereby making it difficult to join the green sheets together. As a result, when the total is more than 98% and less than 80%, the fine through holes may become nonuniform in shape and cracks may be generated around the fine through holes.

According to the present invention, although the thin plate may be made from alumina, zirconia or the like, partially stabilized zirconia is preferably contained as a main component from a view point of providing strength, toughness and abrasion resistance to the thin plate and preventing the generation of a crack between adjacent fine through holes by stress generated during firing. Since the partially stabilized zirconia has a smaller thermal expansion coefficient than metals, it can improve the positional accuracy of the holes under high temperature environment. Further, since the partially stabilized zirconia is excellent in corrosion resistance, abrasion resistance and heat resistance, it can expand the applicable ranges of temperature and a medium.

The average crystal grain diameter of partially stabilized zirconia is preferably 2 μm or less, more preferably 1 μm or less from a viewpoint of improving the surface smoothness and strength of the thin plate.

Further, the partially stabilized zirconia is preferably what is partially stabilized by 2 to 6 mol %, preferably 2.5 to 4.0 mol % of yttrium oxide. This is intended to improve the strength and abrasion resistance of the thin plate.

Still further, a material essentially composed of zirconia partially stabilized by making the crystal phase thereof mainly tetragonal or a mixture of at least two crystal phases out of cubic, tetragonal and monoclinic phases is preferably used in the thin plate. Among them, a single substance of tetragonal phase or a mixture of tetragonal phase and cubic phase is most preferable. This is because the partially stabilized zirconia is excellent in strength and toughness. Further, what contains 10 wt % or less of alumina is preferably used as an additive to improve strength. It is possible to control freely the progress state of sintering of the green sheet for the thin plate and the green sheet for the rigid plate by controlling the content of alumina.

Figure 8:
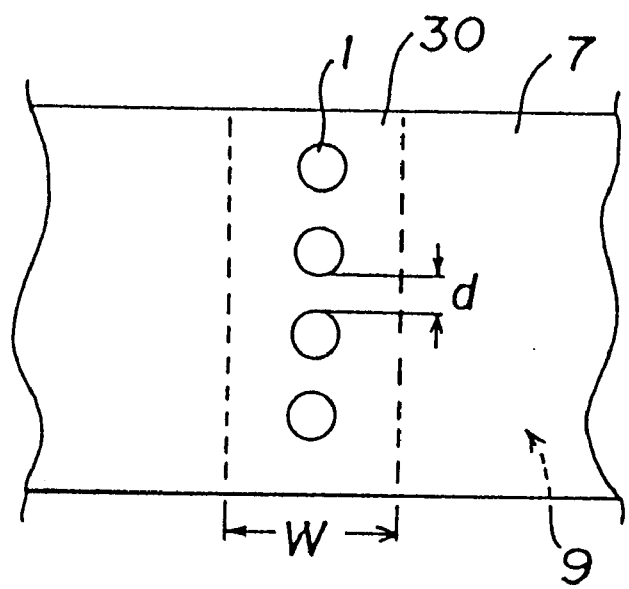
FIG. 8 is a diagram explaining an interval d between adjacent fine through holes.

Furthermore, according to the present invention, as shown in FIG. 8, a maximum value w (mm) of width in a transverse direction of a portion 30 having fine through holes 1 therein of the thin plate 7 supported by the rigid plates 9 at both sides and the interval d (μm) between adjacent fine through holes 1 preferably have the relationship represented by the following expression (A).

$$w \geq 10/d \quad (A)$$

$w \geq 25/d$ is more preferred and $w \geq 50/d$ is the most preferred. When $w \leq 10/d$, a crack is readily generated between adjacent fine through holes or therearound by stress generated during firing. When the maximum value w of width in a transverse direction is more than 10 mm, the handling properties of a green laminate lower and the strength and flatness of the thin plate deteriorate disadvantageously.

In a ceramic member manufactured by the method of the present invention, the total thickness of the rigid plate is preferably 50 $\mu$m or more, more preferably 80 $\mu$m or more. If the thickness is less than 50 $\mu$m, the rigidity of the ceramic member will be insufficient disadvantageously.

Further, the rigid plate is used to provide a certain degree of rigidity to the ceramic member and may have a function. For example, electrodes are formed on the rigid plate, three dimensional wiring is formed in the rigid plate by making through holes therein, a chamber for storing a liquid, fine particle solid or the like is formed in the rigid plate, and the like. Further, the rigid plate may consist of a single layer or a plurality of layers. In the case of a plurality of layers, all the layers do not have to be the same in shape and may have different functions.

Furthermore, the thickness (total thickness) of the rigid plate is preferably larger than the thickness (total thickness) of the thin plate. If the rigid plate is thinner than the thin plate, the dimensional stability of the ceramic member after firing will deteriorate. On the other hand, if the total thickness of the rigid plate is more than 10 times the total thickness of the thin plate, stress applied to the thin plate during firing will be large with the result that a crack is readily generated between adjacent fine through holes or therearound and the thin plate is easily wrinkled or recessed. Therefore, the total thickness of the rigid plate is more preferably larger than the total thickness of the thin plate and less than 5 times the total thickness of the thin plate.

The thickness of the thin plate (total thickness of a plurality of layers of the thin plate) after firing is generally 100 $\mu$m or less, preferably 50 $\mu$m or less, more preferably 30 $\mu$m or less. A reduction in the thickness of the thin plate improves the punching properties of the green sheets, thereby making it possible to prevent blocked holes, broken pins and burrs generated on the punched surface when die/NC punching is carried out and further to improve the shape accuracy of a punched hole (reduced variations in the size of the hole in the front and rear sides of the sheet). Further, the reduction lowers the resistance for passing of a powder, liquid, fine particle solid or the like when it passes through the fine through hole. If the thickness of the thin plate is larger than 100 $\mu$m, the formability of the fine through holes will deteriorate or the above resistance for passing will become large disadvantageously. The thin plate may also consist of a single layer or a plurality of layers.

It cannot be said that the higher the rigidity the better the rigid plate is. It is only necessary to provide appropriate rigidity to the ceramic member. In other words, when the ceramic member is used in such a manner that a drum or the like is contacted to the thin plate, it is important to provide an appropriate difference in rigidity between the thin plate and the rigid plate so as to improve adhesion.

The minimum value (after firing) of the interval between adjacent fine through holes formed in the thin plate must be 150 $\mu$m or less, preferably 100 $\mu$m or less, more preferably 70 $\mu$m or less from a viewpoint of increasing density. By using the production method of the present invention, it is possible to set the interval between adjacent fine through holes to the above value without generating cracks in the thin plate.

Further, the minimum value (after firing) of the size of the fine through holes must be 150 $\mu$m or less, preferably 100 $\mu$m or less, more preferably 70 $\mu$m or less to meet demand for higher density and higher accuracy.

The relationship (sizes after firing) among the thickness t (mm) of the thin plate, the minimum value h ($\mu$m) of the size of a plurality of fine through holes formed in a portion of the thin plate and the interval d (mm) between adjacent fine through holes preferably satisfies the following expression (B).

$$\sqrt{t} \times d/(h+d) \geq 0.7 \tag{B}$$

Incidentally, the relationship (sizes after firing) among the thickness t (mm) of the thin plate, the minimum value h ($\mu$m) of the size of a plurality of fine through holes formed in a portion of the thin plate and the interval d (mm) between adjacent fine through holes more preferably satisfies the following expression (C).

$$\sqrt{t} \times d/(h+d) \geq 1.1 \tag{C}$$

If the relationship does not satisfy the expression (B), a crack will be readily generated between adjacent holes in the process of forming the fine through holes by punching and firing.

Further, a plurality of fine through holes are preferably formed on a plurality of straight lines as shown in FIGS. 3A to 3C, 4A to 4C, 9A to 9C, 11A to 11C and 12A to 12C rather than on a single straight line as shown in FIGS. 1A, 1B and 2A to 2C because the value of the left side of the above expression (B) can be made large, a crack between adjacent holes can be prevented, and a high density, which is an object of the present invention, can be achieved.

Still further, the relationship (sizes after firing) between the thickness t ($\mu$m) of the thin plate and the minimum value h ($\mu$m) of the size of a plurality of fine through holes formed in a portion of the thin plate preferably satisfies the following expression (D), more preferably the following expression (E).

$$t/h \leq 10.0 \tag{D}$$

$$t/h \leq 4.0 \tag{E}$$

If the relationship does not satisfy the expression (D), resistance becomes large when a particle, liquid or the like passes through the fine through holes and the ceramic member cannot fully exhibit its function.

From a view point of the formability of holes when the fine through holes are formed by punching, $t/h \leq 3.0$ is preferred and $t/h \leq 1.0$ is more preferred. When $t/h > 3.0$, punching chips may remain in an inner portion of the fine through hole or therearound, further a crack is readily generated between adjacent holes and therearound, and the punching pin is easily broken disadvantageously.

When a gas, liquid, fine particle solid or the like passes through the fine through holes, $t/h \geq 0.1$ is preferred and $t/h \geq 0.4$ is more preferred in order to provide directionability to the substance.

The relationship between the maximum value w (mm) of width in a transverse direction of a portion having the fine through holes formed therein of the thin plate supported by the rigid plate at both sides and the thickness t ($\mu$m) of the thin plate preferably satisfies the following expression (F), more preferably the following expression (G).

$$t/w \geq 5.0 \tag{F}$$

$$t/w \geq 8.0 \tag{G}$$

If t/w<5.0, the handling properties of the green laminate, the So strength of the thin plate, the flatness of the thin plate and the positional accuracy of the fine through holes will deteriorate disadvantageously.

In the present invention, the green sheet for the thin plate and the green sheet for the rigid plate are manufactured as follows.

A slurry or paste for the production of the green sheets is prepared by mixing ceramic powders with an appropriate binder, plasticizer, dispersant, sintering auxiliary, organic solvent and the like as in the prior art. The above slurry or paste is molded into a green sheet having a predetermined thickness in accordance with a conventionally known method such as doctor blading, calendering, printing, reverse roll coating or the like. The thus obtained green sheet is subjected to processing such as cutting, drilling, punching, formation of fine through holes as required, or a plurality of green sheets are joined together into an integral laminate by thermocompression bonding as a molding having a predetermined shape and thickness. The fine through holes are formed by die/NC punching. The formation of the fine through holes may be made on the green sheet or after lamination.

When what contains partially stabilized zirconia as a main component is used as the material of the thin plate, 30 wt % or less of an auxiliary such as alumina, silica, transition metal oxide, clay, mullite, cordierite, spinel, titania or a mixture thereof may be added to the partially stabilized zirconia powders.

A firing operation is carried out on the molding to convert the laminate into an integral sintered body. The firing temperature at this point is generally 1,200 to 1,700° C., preferably 1,300 to 1,600° C.

For application in a high-precision field shutter, scale or the like, when a ceramic member is used in such a manner that paper, drum or the like is contacted to the thin plate having fine through holes therein of the ceramic member, the contacted substance is brought into close contact with the thin plate to prevent displacement, improve the emission of a gas, liquid, fine particle solid or the like and thereby enhance recording quality advantageously.

Because of the above reason, the following warp fixing process which is aimed to flatten the whole ceramic member and flatten and smoothen the thin plate can be advantageously employed.

The warp fixing process is to fix a warp by placing a smooth ceramic dead weight or the like on a sintered laminate and re-firing it at a temperature close to the firing temperature when there is a warp in the laminate.

For the same reason, the surfaces of the thin plate and the rigid plate of the ceramic member are preferably treated or processed by etching, polishing or grinding after firing or the fixing of a warp to remove fine undulations on the thin plate to flatten the thin plate, remove surface protrusions and attachments (of the same material or a different material) on the thin plate and the rigid plate, reduce the surface roughness Ra (center line average roughness of 0.5 $\mu$m or less, preferably 0.2 $\mu$m or less), improve smoothness, and correct the shape of the ceramic member.

In order to remove the protrusions and attachments on the interior walls of the fine through holes and around the holes, the green sheet for the thin plate having the fine through holes formed therein and the thin plate are preferably treated or processed by laser or etching.

Furthermore, it is possible and preferred to change partially the crystal structures of the surfaces of the thin plate and the rigid plate of the ceramic member formed from a partially stabilized zirconia material intentionally by processing such as polishing or grinding and further heat treatment as required, change the shape of the ceramic member, or bend the ceramic member.

It is advantageous to provide an adhesive auxiliary layer between the green sheets. By providing the adhesive auxiliary layer, lamination pressure can be reduced. The lamination pressure is preferably 100 kg/cm$^2$ or less, more preferably 40 kg/cm$^2$ or less. If the lamination pressure is large, a crack is readily generated between adjacent fine through holes or therearound as the interval between adjacent holes is short. In addition, a laminate having a predetermined shape may not be obtained because of the deformation of the integral laminate, or the positional accuracy of the fine through holes may deteriorate.

The material of the adhesion auxiliary layer is selected from a slurry, paste, binder, plasticizer, solvent and mixtures thereof for the production of a green sheet. The adhesion auxiliary layer is preferably formed by coating, printing, spraying or the like.

Figure 9:
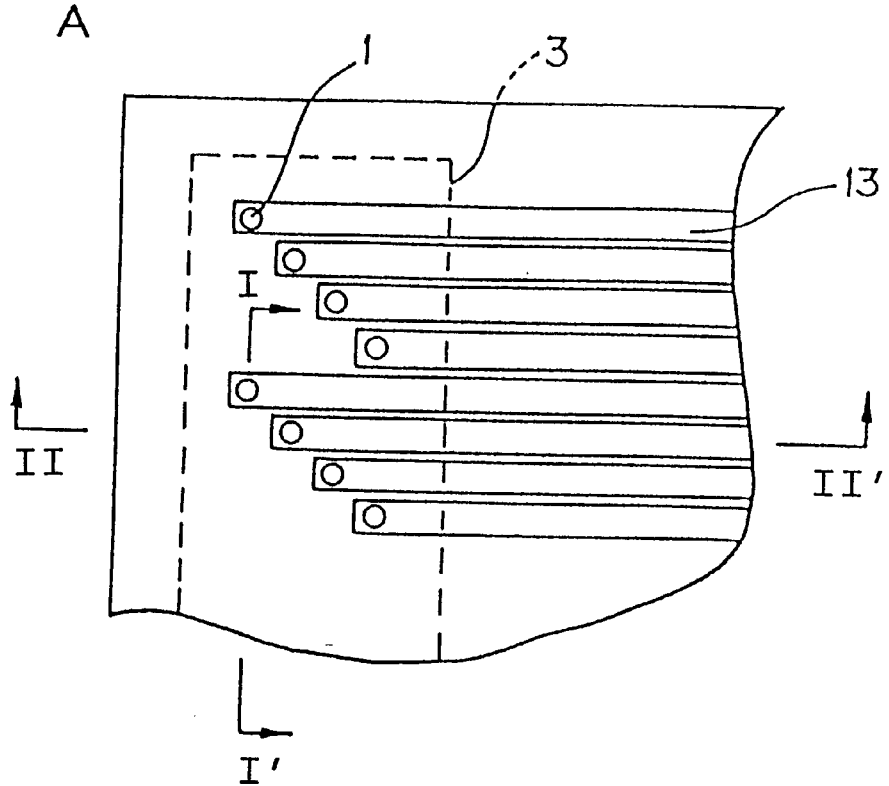
FIGS. 9A to 9C is a sectional view of one example of an electric shutter using a ceramic member manufactured by the method of the present invention.
Figure 9:
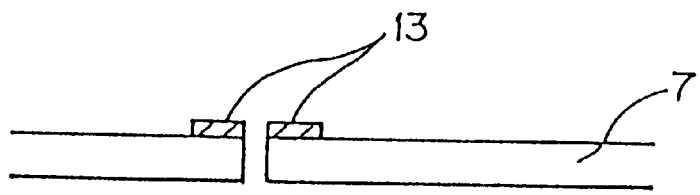
Figure 9:
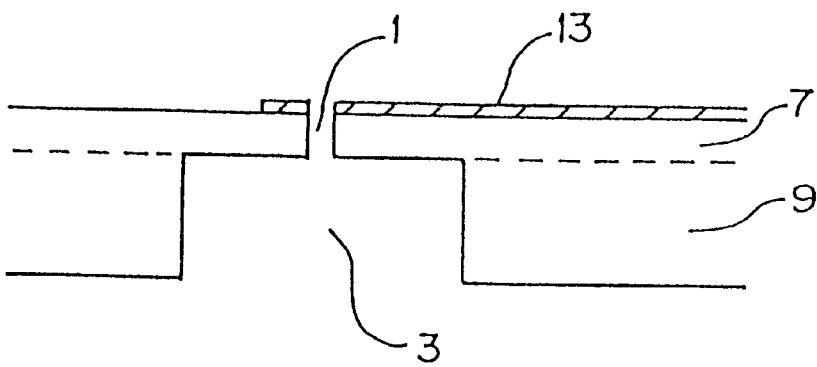

FIGS. 9A to 9C show an example of a field shutter in which gold electrodes 13 are formed on the top surface of the thin plate of a ceramic member manufactured by the method of the present invention.

Figure 10:
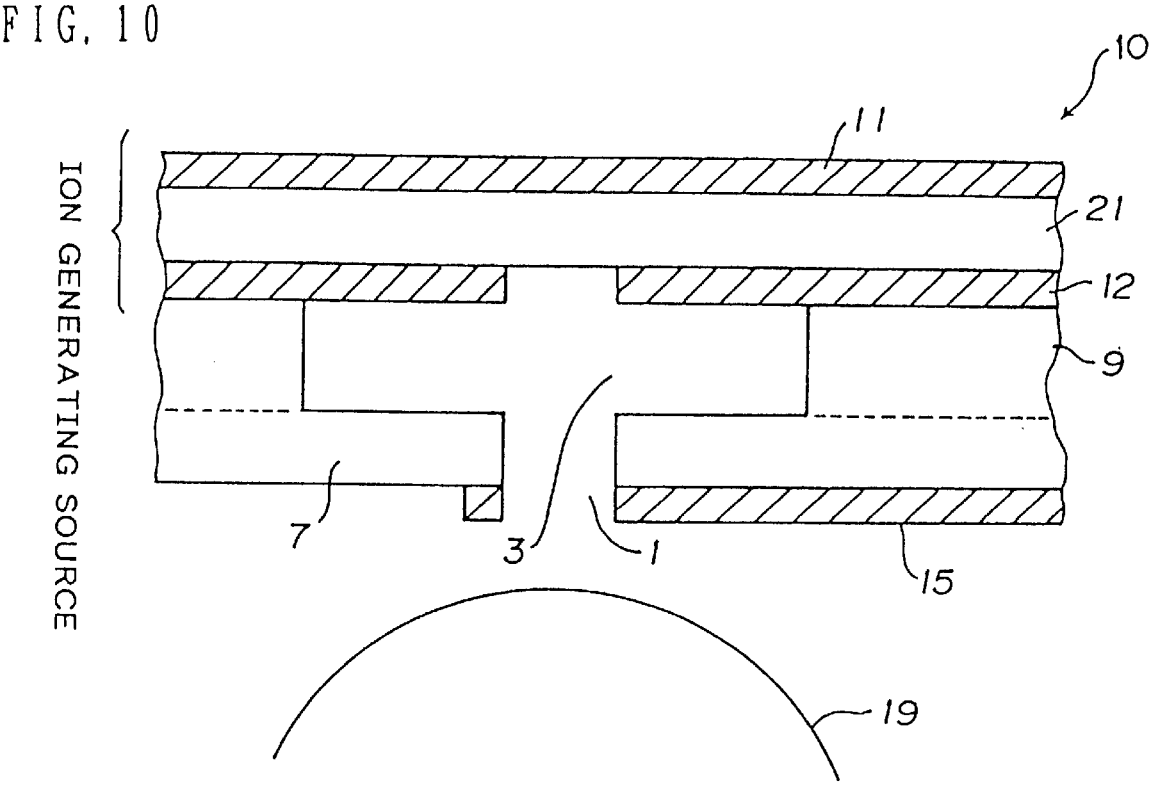
FIG. 10 is a sectional view of one example of an ion current control head using a ceramic member manufactured by the method of the present invention.
Figure 11:
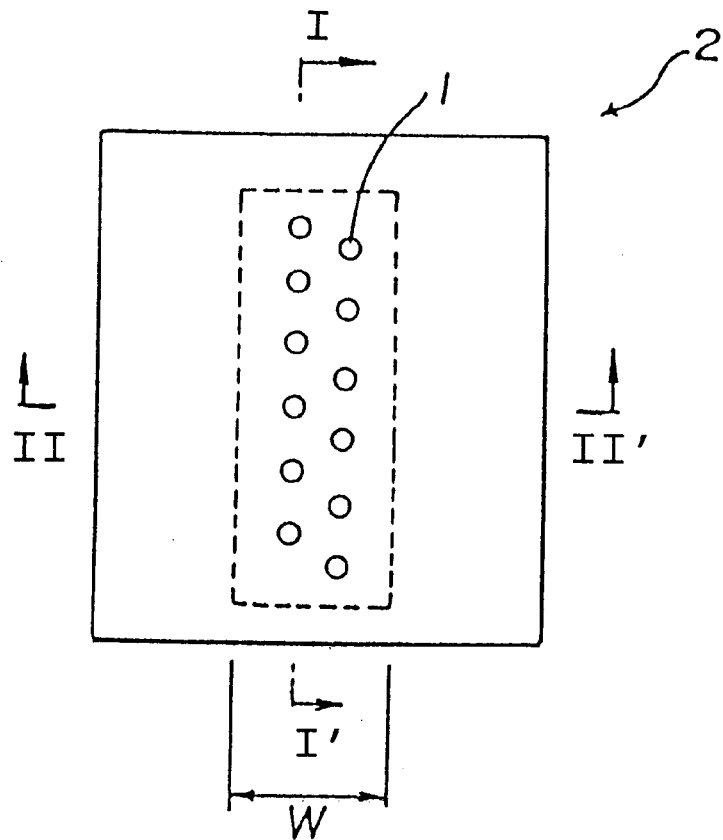
Figure 11:
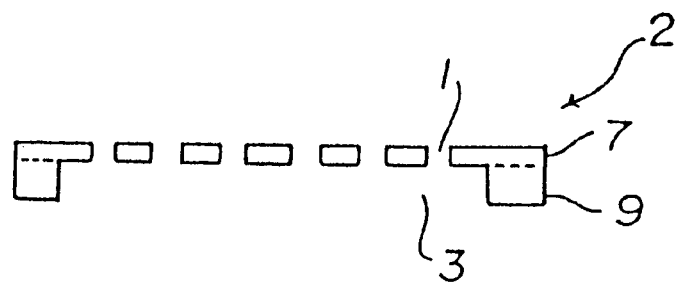
Figure 11:
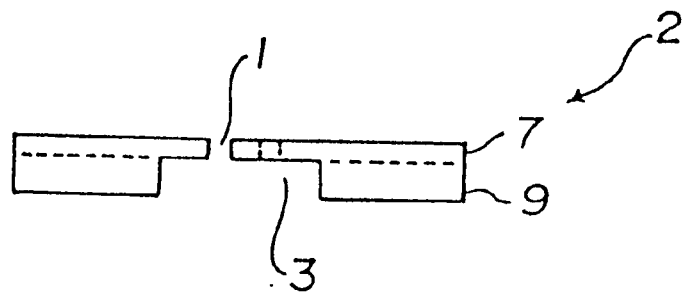
Figure 12:
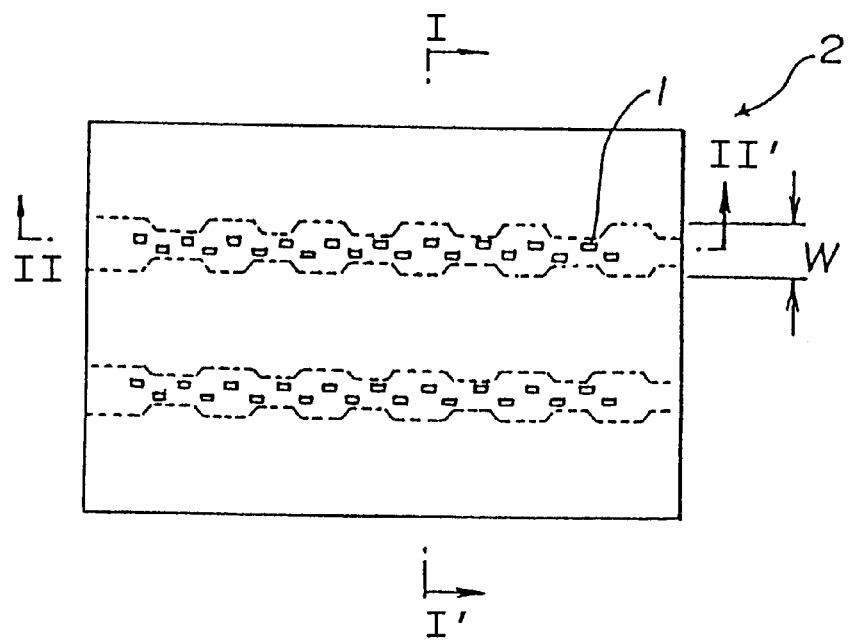
Figure 12:
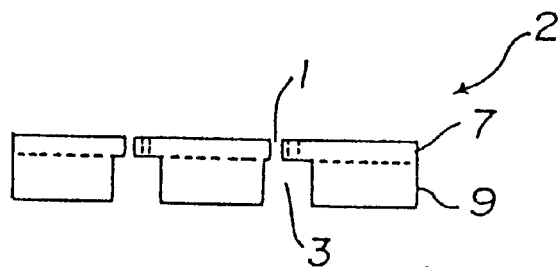
Figure 12:
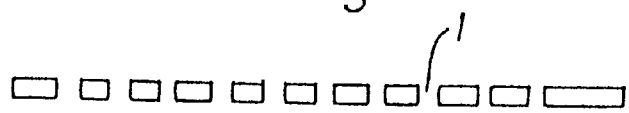
Figure 13:
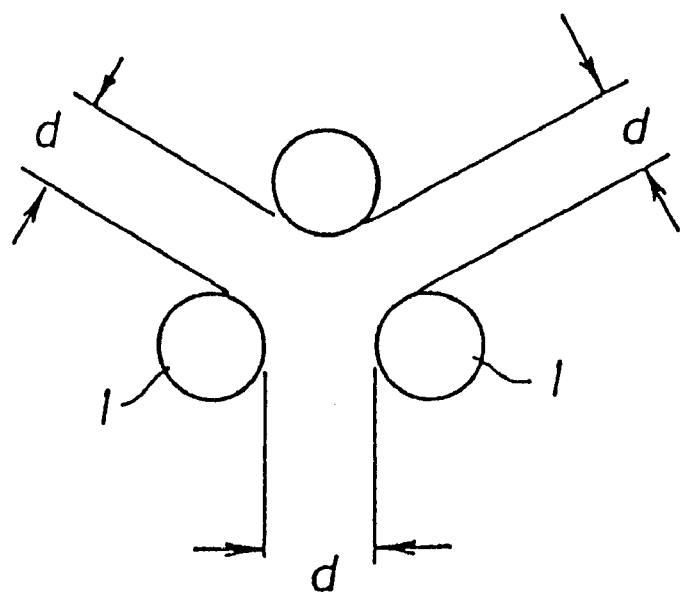
FIG. 13 is a diagram explaining the interval d between adjacent fine through holes when the fine through holes are disposed in a zigzag manner.

As shown in FIG. 10, the thus manufactured ceramic member having electrodes 15 (gold electrodes having a thickness of 0.3 $\mu$m) for an electric field shutter formed on the top surface, an ion generator in which a line electrode 11 and a finger electrode 12 are formed on the front and rear of a dielectric thin plate 21, and a dielectric drum 19 are combined to constitute an ion current control head 10.

As a matter of course, the present invention is not limited to an ion current control head and may be applied to other devices which require a member comprising a thin-wall portion having fine through holes therein. For example, a ceramic member obtained by the present invention can be preferably used for filters, screens, filtration members, or the like, which has the following advantages:

(1) Since the member is made of ceramic, it is excellent in abrasion resistance.

(2) Because the thin plate having fine throughholes has a thickness of 100 $\mu$m or less, a filtration resistance can be decreased.

(3) Since the rigid plate supports the thin plate, the member hardly breaks.

(4) Since a density of fine through holes can be increased, an efficiency of a filtration area can be increased.

EXAMPLE 1

A ceramic member was manufactured by the method of the present invention and the generation of a crack was investigated in the process of forming fine through holes by punching and the process of firing.

A green sheet for a thin plate was first manufactured as follows.

100 parts by weight of partially stabilized zirconia containing 3 mol % of $Y_2O_3$ and 0.1 mol % of $Al_2O_3$, 12.3 parts by weight of a polyvinyl butyral resin (PVB) (BM-2 of Sekisui Chemical Co., Ltd.) (binder), 12.3 parts by weight of DOP (plasticizer), 50 parts by weight of xylene (solvent) and 50 parts by weight of 1-butanol (solvent) were mixed in a ball mill for 30 hours to prepare a slurry for molding a green sheet. This slurry was vacuum defoamed to adjust its viscosity to 4,000 cps and then formed into a green sheet for a thin plate with a doctor blade to ensure that its thickness after firing became 30 $\mu$m.

Using an NC punching machine, 40 $\mu$m-diameter fine through holes were formed in the above green sheet for a thin plate at intervals of 36.7 μm and cut into a 230×20 mm sample piece. The fine through holes were formed in 4 rows, each consisting of 708 holes, making a total of 2,832.

A green sheet for a rigid plate was then manufactured as follows.

A slurry for molding the green sheet was prepared in the same manner as the green sheet for the thin plate. To adjust the pre-sintering temperature $T_{50}$ and the firing shrinkage factor F of the green sheet for the rigid plate, the particle diameter of partially stabilized zirconia powders, the content of $Al_2O_3$, the mixing time in the ball mill and the proportion of organic components were changed.

Using the above slurry, the green sheet for the rigid plate was formed by a doctor blade to ensure that its thickness after firing became 100 μm.

An adhesive auxiliary layer was then formed on the green sheet for the rigid plate. 100 parts by weight of partially stabilized zirconia powders containing 3 mol % of $Y_2O_3$ and 0.1 mol % of $Al_2O_3$, 13 parts by weight of PVB (BM-2 of Sekisui Chemical Co., Ltd.) (binder), 5 parts by weight of DOP (plasticizer) and an appropriate amount of 2-ethyl hexanol (solvent) were kneaded by a triroll mill to prepare a paste for the adhesive auxiliary layer having a viscosity of 20,000 cps. This paste was printed on the green sheet for the rigid plate using a screen printing machine to form an adhesive auxiliary layer having a thickness of 6 μm after drying.

The thus obtained green sheet for the rigid plate having an adhesive auxiliary layer thereon was cut and punched to form a 201×3.0 mm window portion and cut into a 230×20 mm sample piece.

Next, the above green sheet for the thin plate was placed upon the green sheet for the rigid plate having an adhesive auxiliary layer thereon in such a manner that a portion having fine through holes formed therein of the green sheet for the thin plate was located at the center of the window portion of the green sheet for the rigid plate, and joined together by thermocompression bonding at 30 kg/cm² and 80° C. for 1 minute to form an integral laminate. This integral laminate was fired at 1,500° C. for 3 hours and then this fired product was sandwiched between 2 mm thick porous alumina flat plates and re-fired at 1,500° C. for 5 hours to fix a warp.

Table 1 shows the measurement values or calculated values of the particle diameter ($D_L$), sphere equivalent diameter ($D_{BET}$) and volume percentage (A) of the ceramic powders, the total (A+B) of the volume percentage of the ceramic powders and the volume percentage (B) of the organic components, pre-sintering temperature ($T_{50}$), firing shrinkage factor (F), tensile strength (σ) and elongation at rupture (ΔI·S/T) of the green sheet for the thin plate and the pre-sintering temperature and firing shrinkage factor (F) of the green sheet for the rigid plate. The absolute value |T| of difference of pre-sintering temperature and the absolute value |F| of difference of firing shrinkage factor between the green sheet for the thin plate and the green sheet for the rigid plate are also shown in Table 1. In the calculation of the volume percentage of the ceramic powders and the percentage of the organic components, the theoretical density of the zirconia powders is set to 6.1 g/cm³ and the logical density of the organic components is set to 1.1 g/cm³. The table also shows the generation of cracks during punching and after firing.

TABLE 1

| | Green sheet for thin plate | | | | | | | | | | |
|---|---|---|---|---|---|---|---|---|---|---|---|
| Example No. | $D_L$ (μm) | $D_{BET}$ (μm) | Binder (parts by weight) | DOP (parts by weight) | Dispersant (parts by weight) | A (%) | A + B (%) | $T_{50}$ (° C.) | F (%) | σ (kgf/cm²) | ΔI · S/T (mm³/kgf) |
| 1 | 2.0 | 1.0 | PVB 12.3 | 12.3 | 0 | 40 | 100 | 1400 | 26.30 | 20 | 25 |
| 2 | 0.30 | 0.10 | PVB 10.8 | 2.0 | 0 | 54 | 96 | 1150 | 18.55 | 200 | 0.5 |
| 3 | 0.58 | 0.15 | PVB 7.4 | 3.6 | 2.0 | 49 | 88 | 1270 | 21.10 | 65 | 1.9 |
| 4 | 0.58 | 0.15 | PVB 7.4 | 3.6 | 2.0 | 49 | 88 | 1270 | 21.10 | 65 | 1.9 |
| 5 | 0.58 | 0.15 | PVB 7.4 | 3.6 | 2.0 | 49 | 88 | 1270 | 21.10 | 65 | 1.9 |
| 6 | 0.58 | 0.15 | PVB 7.4 | 3.6 | 2.0 | 49 | 88 | 1270 | 21.10 | 65 | 1.9 |
| 7 | 0.58 | 0.15 | PVB 7.4 | 3.6 | 2.0 | 49 | 88 | 1270 | 21.10 | 65 | 1.9 |
| 8 | 0.58 | 0.15 | PVB 4.0 | 7.0 | 2.0 | 45 | 81 | 1270 | 23.33 | 30 | 6 |
| 9 | 0.58 | 0.15 | PVB 4.0 | 7.0 | 2.0 | 45 | 81 | 1270 | 23.33 | 30 | 6 |
| 10 | 0.58 | 0.15 | PVB 4.0 | 7.0 | 2.0 | 45 | 81 | 1270 | 23.33 | 30 | 6 |
| 11 | 1.2 | 0.5 | Acryl 13.0 | 2.0 | 0 | 41 | 98 | 1330 | 25.66 | 25 | 18 |

| Example No. | Generation of cracks during punching | Green sheet for rigid plate | | [T] (° C.) | [F] (%) | Generation of cracks after firing |
|---|---|---|---|---|---|---|
| | | $T_{50}$ (° C.) | F (%) | | | |
| 1 | No | 1400 | 26.30 | 0 | 0 | No |
| 2 | No | 1150 | 18.55 | 0 | 0 | No |
| 3 | No | 1220 | 21.10 | 50 | 0 | No |
| 4 | No | 1250 | 21.10 | 20 | 0 | No |
| 5 | No | 1270 | 21.10 | 0 | 0 | No |
| 6 | No | 1290 | 21.10 | 20 | 0 | No |
| 7 | No | 1320 | 21.10 | 50 | 0 | No |
| 8 | No | 1270 | 22.04 | 0 | 1.29 | No |
| 9 | No | 1270 | 23.33 | 0 | 0 | No |
| 10 | No | 1270 | 24.49 | 0 | 1.16 | No |
| 11 | No | 1330 | 25.66 | 0 | 0 | No |

EXAMPLES 2 TO 11

Ceramic members were manufactured in the same manner as in Example 1 except that the particle diameter ($D_L$) and sphere equivalent diameter ($D_{BET}$) of the ceramic powders, the amount of a binder added and the amount of DOP added were changed and a sorbitan fatty acid ester was added as a dispersant as the case may be and the generation of cracks was checked during the formation of fine through holes by punching and in the firing process. In Example 11, an acrylic resin prepared by mixing the SA-541 (solid content) and OXSA-272 (solid content) of Mitsui Toatsu Chemicals, Inc. in a weight ratio of 12.0:1.0 was used as a binder. Table 1 shows the values of characteristic properties and the generation of cracks.

COMPARATIVE EXAMPLES 1 TO 9

Green sheets for a thin plate were manufactured in the same manner as in Example 1 except that the particle diameter ($D_L$) and sphere equivalent diameter ($D_{BET}$) of the ceramic powders, the amount of a binder added and the amount of DOP added were changed and a sorbitan fatty acid ester was added as a dispersant as the case may be. In Comparative Example 8, the DR-1001 acrylic resin of Shin-Nakamura Kagaku Co. was used as a binder.

Ceramic members were manufactured from green sheets in which no cracks were generated during the formation of fine through holes by punching in the same manner as in Example 1 and the generation of cracks was checked in the firing process. The absolute value of difference of sintering temperature between the green sheet for the thin plate and the green sheet for the rigid plate is more than 50° C. in Comparative Examples 1, 2 and 5 and the absolute value of difference of firing shrinkage factor therebetween is more than 1.5% in Comparative Examples 3 and 4. The tensile strength σ is less than 10 kgf/cm² in Comparative Examples 6 and 8 and the elongation ΔI·S/T is less than 0.5 mm³/kgf or more than 25.0 mm³/kgf in Comparative Examples 7, 8 and 9. Table 2 shows the values of characteristic properties and the generation of cracks.

TABLE 2

| Comparative Example No. | Green sheet for thin plate |||||||||| |
|---|---|---|---|---|---|---|---|---|---|---|
| | $D_L$ (μm) | $D_{BET}$ (μm) | Binder (parts by weight) | DOP (parts by weight) | Dispersant (parts by weight) | A (%) | A + B (%) | $T_{50}$ (° C.) | F (%) | σ (kgf/cm²) | ΔI · S/T (mm³/kgf) |
| 1 | 0.58 | 0.15 | PVB 7.4 | 3.6 | 2.0 | 49 | 88 | 1270 | 21.10 | 65 | 1.9 |
| 2 | 0.58 | 0.15 | PVB 7.4 | 3.6 | 2.0 | 49 | 88 | 1270 | 21.10 | 65 | 1.9 |
| 3 | 0.58 | 0.15 | PVB 4.0 | 7.0 | 2.0 | 45 | 81 | 1270 | 23.33 | 30 | 6 |
| 4 | 0.58 | 0.15 | PVB 4.0 | 7.0 | 2.0 | 45 | 81 | 1270 | 23.33 | 30 | 6 |
| 5 | 1.2 | 0.5 | Acryl 13.0 | 2.0 | 0 | 41 | 98 | 1330 | 25.66 | 25 | 18 |
| 6 | 2.0 | 1.0 | PVB 7.9 | 7.9 | 10.0 | 35 | 90 | 1420 | 29.48 | 5 | 20 |
| 7 | 2.0 | 1.0 | PVB 11.0 | 13.0 | 0 | 40 | 100 | 1400 | 26.25 | 20 | 30 |
| 8 | 2.0 | 1.0 | Acryl 13.0 | 5.0 | 2.0 | 46 | 97 | 1390 | 22.77 | 3 | 50 |
| 9 | 0.30 | 0.10 | PVB 10.0 | 1.0 | 0 | 54 | 90 | 1150 | 18.52 | 200 | 0.2 |

| Comparative Example No. | Generation of cracks during punching | Green sheet for rigid plate || | | Generation of cracks after firing |
|---|---|---|---|---|---|---|
| | | $T_{50}$ (° C.) | F (%) | [T] (° C.) | [F] (%) | |
| 1 | No | 1200 | 21.10 | 70 | 0 | Yes |
| 2 | No | 1340 | 21.10 | 70 | 0 | Yes |
| 3 | No | 1270 | 21.40 | 0 | 1.93 | Yes |
| 4 | No | 1270 | 25.31 | 0 | 1.98 | Yes |
| 5 | No | 1270 | 25.66 | 60 | 0 | Yes |
| 6 | Yes | — | — | — | — | — |
| 7 | Yes | — | — | — | — | — |
| 8 | Yes | — | — | — | — | — |
| 9 | Yes | — | — | — | — | — |

In Comparative Examples 1 to 5, no cracks were generated between adjacent fine through holes during the formation of the fine through holes by punching. However, cracks were generated between adjacent fine through holes or therearound in the thin plate in the process of firing. In Comparative Examples 6 to 9, cracks were generated between adjacent fine through holes during the formation of the fine through holes by punching.

On the other hand, in the above Examples, no cracks were generated during the formation of the fine through holes and in the process of firing.

In the above Examples and Comparative Examples, after the fine through holes were formed in the green sheet for the thin plate, the green sheet for the thin plate was laminated upon the green sheet for the rigid plate, and the resulting laminate was fired. When the green sheet for the thin plate and the green sheet for the rigid plate were manufactured in the same manner as in Examples 1 to 11 and Comparative Examples 1 to 9, a green laminate of the green sheets for the thin plate and the rigid plate was formed, fine through holes were formed in the laminate, and the obtained laminate having the fine through holes was fired; no cracks were generated in the ceramic members corresponding to Examples 1 to 11; whereas cracks were generated in the ceramic members corresponding to Comparative Examples 1 to 9.

According to the present invention, a ceramic member is manufactured by controlling the tensile strength and elongation factor of the green sheet for the thin plate and the absolute value of difference of pre-sintering temperature and the absolute value of difference of firing shrinkage factor between the green sheet for the thin plate and the green sheet for the rigid plate to predetermined values. Thereby, even when the thin plate is made thin and the size of the fine through holes and the interval between adjacent fine through holes are made small, no cracks are generated between adjacent fine through holes or therearound at the time of punching. Since the shrinkages of the green sheet for the thin plate and the green sheet for the rigid plate in the process of firing are controlled, the generation of cracks between adjacent fine through holes can be prevented in the process of firing. Further, since the green sheet for the thin plate does not elongate or deform at the time of punching or handling the integral laminate and undulations on the thin plate manufactured by firing can be reduced, the positional accuracy of the fine through holes can be improved to increase the density of the fine throughholes in ceramic member.

What is claimed is:

1. A method of manufacturing a ceramic member comprising a thin plate having a plurality of fine through holes and a rigid plate integrally formed with the thin plate by firing, said thin plate being supported by said rigid plate at least at both sides of a portion where the plurality of fine through holes are formed, which comprises the steps of:

providing a green sheet for the thin plate having a tensile strength σ of 10 kgf/cm$^2$ or more and 200 kgf/cm$^2$ or less, an elongation factor represented by the expression ΔI·S/T, where ΔI represents an amount (mm) of elongation at rupture; T, a tension (kgf) at rupture; and S, a cross section (mm$^2$) of the green sheet for the thin plate, being 0.5 mm$^3$/kgf or more and 25.0 mm$^3$/kgf or less;

providing a green sheet for the rigid plate, an absolute value of the difference of pre-sintering temperature $T_{50}$ between the green sheet for the thin plate and the green sheet for the rigid plate being 50° C. or less, and an absolute value of the difference of firing shrinkage factor F therebetween being 1.5% or less;

laminating said green sheet for the thin plate having the plurality of fine through holes formed by punching upon said green sheet for the rigid plate to form an integral laminate; and firing the integral laminate to obtain the ceramic member.

2. The method of manufacturing a ceramic member according to claim 1, wherein a thickness of said thin plate is 50 μm or less.

3. The method of manufacturing a ceramic member according to claim 1, wherein the absolute value of the difference of pre-sintering temperature $T_{50}$ between the green sheet for said thin plate and the green sheet for said rigid plate is 20° C. or less.

4. The method of manufacturing a ceramic member according to claim 1, wherein an average particle diameter $D_L$ of ceramic powders constituting the green sheet for said thin plate is 0.1 μm or more and 1.2 μm or less, a sphere equivalent diameter $D_{BET}$ calculated from the BET specific surface area of said ceramic powders is 0.02 μm or more and 0.5 μm or less, a volume percentage A of the ceramic powders in the green sheet for said thin plate is 40% or more and 55% or less, and a total of the volume percentage A of the ceramic powders and a percentage B of organic components is 80% or more and 98% or less.

5. The method of manufacturing a ceramic member according to claim 1, wherein said thin plate consists essentially of a partially stabilized zirconia.

6. The method of manufacturing a ceramic member according to claim 5, wherein said partially stabilized zirconia has an average crystal grain diameter of 2 μm or less.

7. The method of manufacturing a ceramic member according to claim 6, wherein said partially stabilized zirconia is prepared by partially stabilizing zirconia with 2 to 6 mol % of yttrium oxide.

8. The method of manufacturing a ceramic member according to claim 1, wherein a maximum value w (mm) of width in a transverse direction of a portion having said fine through holes therein of said thin plate and supported by the rigid plate at both sides, and an interval d (μm) between adjacent fine through holes have the relationship represented by the following expression (A):

$$w \geq 10/d \quad (A).$$

9. A method of manufacturing a ceramic member comprising a thin plate having a plurality of fine through holes and a rigid plate integrally formed with the thin plate by firing, said thin plate being supported by said rigid plate at least at both sides of a portion where the plurality of fine through holes are formed, which comprises the steps of:

providing a green sheet for the thin plate having a tensile strength σ of 10 kgf/cm$^2$ or more and 200 kgf/cm$^2$ or less, an elongation factor represented by the expression ΔI·S/T, where ΔI represents an amount (mm) of elongation at rupture; T, a tension (kgf) at rupture; and S, a cross section (mm$^2$) of the green sheet for the thin plate, being 0.5 mm$^3$/kgf or more and 25.0 mm$^3$/kgf or less;

providing a green sheet for the rigid plate, an absolute value of the difference of pre-sintering temperature $T_{50}$ between the green sheet for the thin plate and the green sheet for the rigid plate being 50° C. or less, and an absolute value of the difference of firing shrinkage factor F therebetween being 1.5% or less;

laminating said green sheet for the thin plate upon said green sheet for the rigid plate to form an integral laminate;

forming the plurality of fine through holes by punching in said green sheet for the thin plate; and firing the integral laminate to obtain the ceramic member.

10. The method of manufacturing a ceramic member according to claim 9, wherein a thickness of said thin plate is 50 μm or less.

11. The method of manufacturing a ceramic member according to claim 9, wherein the absolute value of the difference of pre-sintering temperature $T_{50}$ between the green sheet for said thin plate and the green sheet for said rigid plate is 20° C. or less.

12. The method of manufacturing a ceramic member according to claim 9, wherein an average particle diameter $D_L$ of ceramic powders constituting the green sheet for said thin plate is 0.1 μm or more and 1.2 μor less, a sphere equivalent diameter $D_{BET}$ calculated from the BET specific surface area of said ceramic powders is 0.02 μm or more and 0.5 μm or less, a volume percentage A of the ceramic powders in the green sheet for said thin plate is 40% or more and 55% or less, and a total of the volume percentage A of the ceramic powders and a percentage B of organic components is 80% or more and 98% or less.

13. The method of manufacturing a ceramic member according to claim 9, wherein said thin plate consists essentially of a partially stabilized zirconia.

14. The method of manufacturing a ceramic member according to claim 13, wherein said partially stabilized zirconia has an average crystal grain diameter of 2 μm or less.

15. The method of manufacturing a ceramic member according to claim 14, wherein said partially stabilized zirconia is prepared by partially stabilizing zirconia with 2 to 6 mol % of yttrium oxide.

16. The method of manufacturing a ceramic member according to claim 9, wherein a maximum value w (mm) of width in a transverse direction of a portion having said fine through holes therein of said thin plate and supported by the rigid plate at both sides, and an interval d (μm) between adjacent fine through holes have the relationship represented by the following expression (A):

$$w \geq 10/d \tag{A}$$

* * * * *